Sept. 13, 1955     J. M. JACKSON     2,717,775
OVERLOAD GAGE FOR A TRUCK AXLE
Filed April 29, 1955
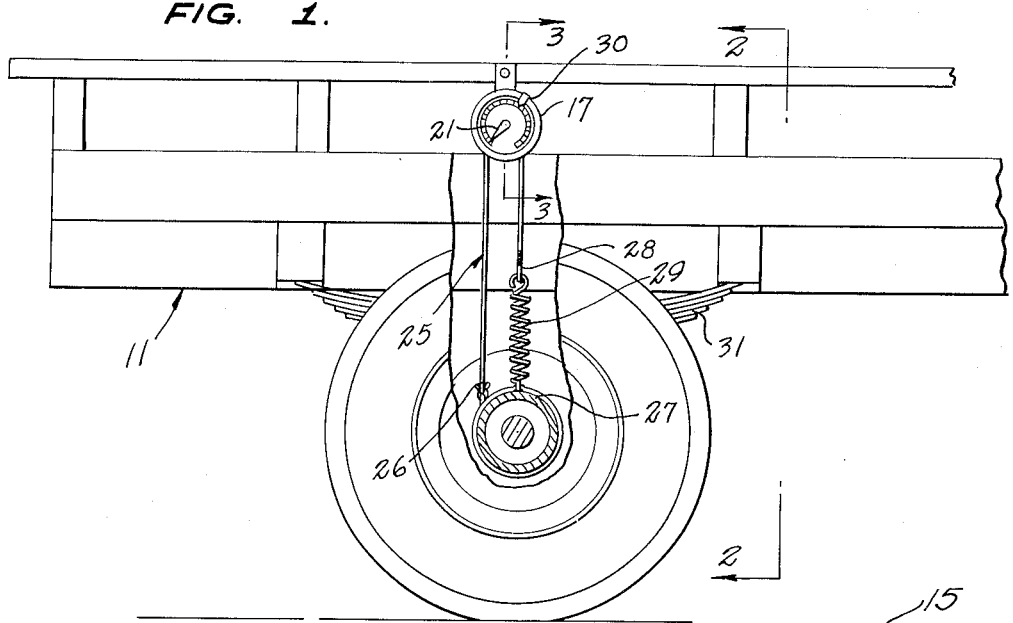
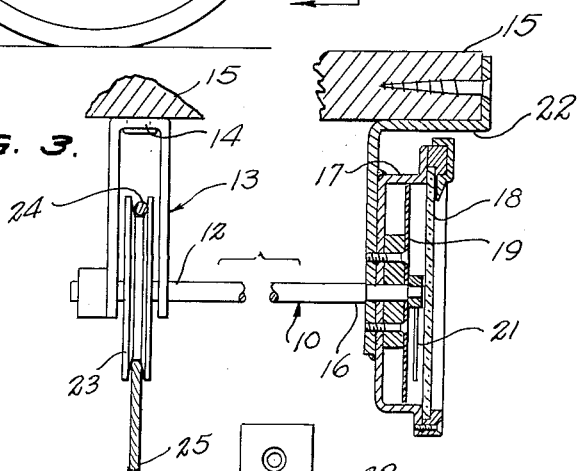
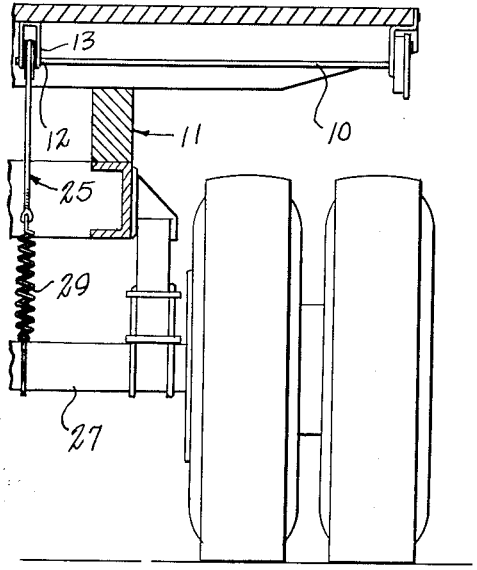
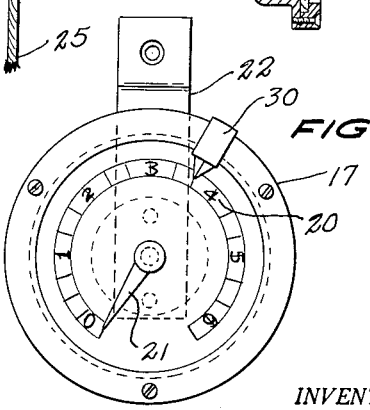
INVENTOR.
JAMES M. JACKSON,
BY
McMorrow, Berman + Davidson
ATTORNEYS.

United States Patent Office 2,717,775
Patented Sept. 13, 1955

2,717,775

OVERLOAD GAGE FOR A TRUCK AXLE

James Milton Jackson, Evansville, Ind.

Application April 29, 1955, Serial No. 504,846

2 Claims. (Cl. 265—42)

The present invention relates to an overload gage for a truck axle and in particular to a gage remotely positioned with respect to the axle housing which indicates the actual load of the truck axle.

The primary object of the present invention is to provide an overload gage for a truck axle having a non-rigid connection between the truck bed and the axle housing so that road shocks are not positively transmitted to the gage mechanism.

Another object of the present invention is to provide an overload gage for a truck axle which can be installed upon the vehicle body or truck bed remote from the axle housing and at a point where the gage is conveniently read.

A further object of the present invention is to provide a gage for the axle load of a vehicle which is simple in structure, sturdily constructed and one economical to manufacture and assemble.

These and other objects and advantages of the present invention will be fully apparent from the following description when taken in connection with the annexed drawings, in which:

Figure 1 is a side view in elevation of a portion of a truck body showing in broken away section the installation of the gage of the present invention installed thereon.

Figure 2 is an end view partially in cross-section on line 2—2 of Figure 1,

Figure 3 is a detailed view greatly enlarged and partially in cross-section as seen in line 3—3 of Figure 1, and Figure 4 is a view in elevation greatly enlarged of the gage plate and index arm shown in the assembly of Figure 1.

Referring in greater detail to the drawings in which like numerals indicate like parts throughout the several views, the present invention consists in an overload gage for a truck axle comprising a horizontally disposed shaft 10 extending under a portion of the bed of a truck or other vehicle, indicated generally by the reference numeral 11, the shaft 10 being supported at one end 12 by an inverted U-shaped bracket 13 which has its bight 14 fixedly secured to the underside of the truck bed 15. The other end 16 of the shaft 10 extends into a casing 17 having a transparent face 18 covering a gage plate 19 on which are scale markings 20, as shown in Figure 4.

An arm 21 is fixedly secured to the end 16 of the shaft 10 within the casing 17 and traverses the gage plate 19 as the shaft rotates. An angled bracket 22 supports the casing 17 below the overhanging edge of the truck bed 15.

The end 12 of the shaft carries a pulley 23 constituting a guide means over which extends the intermediate portion 24 of an inverted U-shaped vertically extending flexible rope or cable 25.

One leg 26 of the cable 25 is fixedly secured to the axle housing 27 while the other leg 28 is secured to one end of a coil spring 29 which has its other end secured under tension to the axle housing 27 at a point spaced from the connection of the leg 26 to the axle housing 27.

The outer edge of the front face of the casing 17 carries a slidable pointer 30 which may be set opposite any one of the scale markings 20 to provide a reference point indicative of a prescribed axle load for the particular vehicle on which the gage is installed.

In use, the cable 25 is adjusted relative to the shaft and pulley so that the index arm 21 indicates zero when there is no load on the truck bed 15. Upon loading the truck the resilient spring 29 will draw the cable as the truck spring 31 permits the movement of the truck bed 15 relative to the axle housing 27. The gage plate 19 is calibrated so that its scale markings 20 indicate the number of pounds or tons of load received on the truck bed and axle.

What is claimed is:

1. An overload gage for a truck axle comprising a horizontally disposed shaft adapted to be rotatably supported upon the bed of a truck, guide means carried by one end of said shaft, an inverted U-shaped vertically disposed flexible element having its bight rollably supported on said guide means with the free end of one of its legs adapted to be fixedly attached to the axle housing of said track, a vertically disposed coil spring having one end attached to the free end of the other leg of said flexible element and having the other end adapted to be attached to a portion of said axle housing spaced from the fixed connection of the free end of said one leg of said element, an upstanding gage plate having scale markings thereon adapted to be supported on said truck bed adjacent the other end of said shaft, and an index arm fixedly carried by the other end of said shaft and arranged to traverse said gage plate to provide an indication of the axle load of said truck.

2. An overload gage for a truck axle comprising a horizontally disposed shaft adapted to be rotatably supported upon the bed of a truck, a pulley carried by one end of said shaft, an inverted U-shaped vertically disposed flexible element having its bight rotatably supported on said pulley with the free end of one of its legs adapted to be fixedly attached to the axle housing of said truck, a vertically disposed coil spring having one end attached to the free end of the other leg of said flexible element and having the other end adapted to be attached to a portion of said axle housing spaced from the fixed connection of the free end of said one leg of said element, an upstanding gage plate having scale markings thereon adapted to be supported on said truck bed adjacent the other end of said shaft, and an index arm fixedly carried by the other end of said shaft and arranged to traverse said gage plate to provide an indication of the axle load of said axle.

No references cited.